United States Patent [19]
Dais et al.

[11] Patent Number: 5,478,228
[45] Date of Patent: Dec. 26, 1995

[54] APPARATUS FOR MAKING A ZIPPER FOR A RECLOSABLE THERMOPLASTIC BAG

[75] Inventors: Brian C. Dais, Midland; Jose Porchia, Midland; John O. McCree, Saginaw; Raymond R. Rydman, Coleman; Bertha R. Vaughn, Midland, all of Mich.

[73] Assignee: Dowbrands LP, Indianapolis, Ind.

[21] Appl. No.: 152,515

[22] Filed: Nov. 16, 1993

Related U.S. Application Data

[60] Continuation of Ser. No. 761,125, Sep. 17, 1991, Pat. No. 5,307,552, which is a division of Ser. No. 531,951, Jun. 1, 1990, Pat. No. 5,070,584, which is a continuation-in-part of Ser. No. 491,389, Mar. 9, 1990, abandoned.

[51] Int. Cl.⁶ .................................................. B28B 11/12
[52] U.S. Cl. ........................... 425/294; 72/198; 83/109; 83/176; 83/669; 425/306; 425/307; 425/814
[58] Field of Search .................. 72/186, 198; 83/109, 83/176, 343, 669, 670; 425/290, 294, 306, 307, 814

[56] References Cited

U.S. PATENT DOCUMENTS

| | | |
|---|---|---|
| 346,138 | 7/1886 | Whitty .................................. 72/198 |
| 371,736 | 10/1887 | Burton . |
| 823,021 | 6/1906 | Andrews . |
| 1,202,122 | 10/1916 | Swift, Jr. . |
| 1,353,087 | 9/1920 | Swift, Jr. . |
| 1,924,160 | 8/1933 | Knowlton . |
| 2,320,651 | 6/1943 | Poux .................................... 72/198 |
| 2,797,754 | 7/1957 | Bornemann . |
| 2,867,001 | 1/1959 | Lewis et al. . |
| 2,895,170 | 2/1959 | Carlite . |
| 3,425,113 | 2/1969 | Ward, Jr. ............................. 72/198 |
| 3,825,393 | 3/1974 | Bittner . |
| 3,829,938 | 8/1974 | Ballin . |
| 3,955,245 | 5/1976 | Ballin . |
| 3,999,924 | 12/1976 | Tanaka ................................ 72/186 |
| 4,073,208 | 2/1978 | Kirkpatrick . |
| 4,220,272 | 9/1980 | Danti . |
| 4,479,244 | 10/1984 | Ausnit . |

Primary Examiner—P. W. Echols

[57] ABSTRACT

Disclosed is a zipper for a reclosable thermoplastic bag having opposing rib and groove profiles wherein at least one of the opposing zipper profiles has an longitudinally extending part interlockable and substantially free of interdigitation with the opposing profile and wherein the part is structurally discontinuous along its length. When the rib and groove profiles are interlocked, an audible clicking sound and/or a vibratory or bumpy feel perceptible to the touch is imparted.

Further disclosed is a process and apparatus for making the zipper wherein a zipper profile is extruded and indentions are formed within and along it.

4 Claims, 8 Drawing Sheets

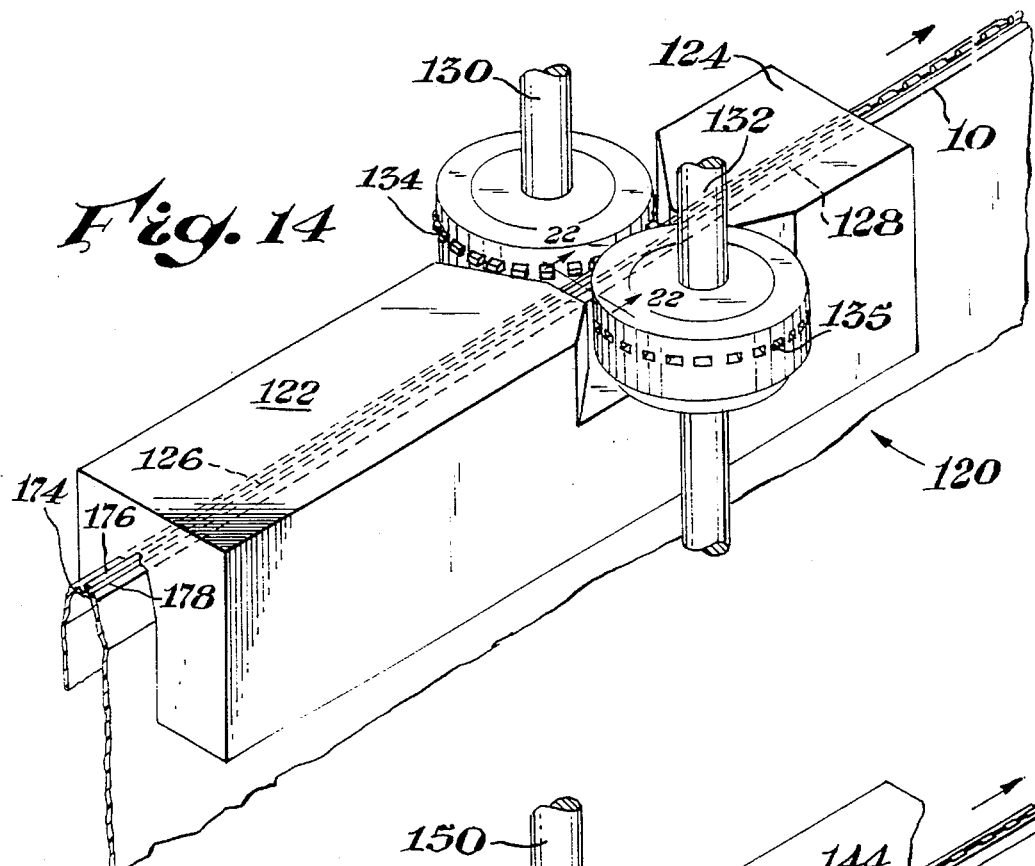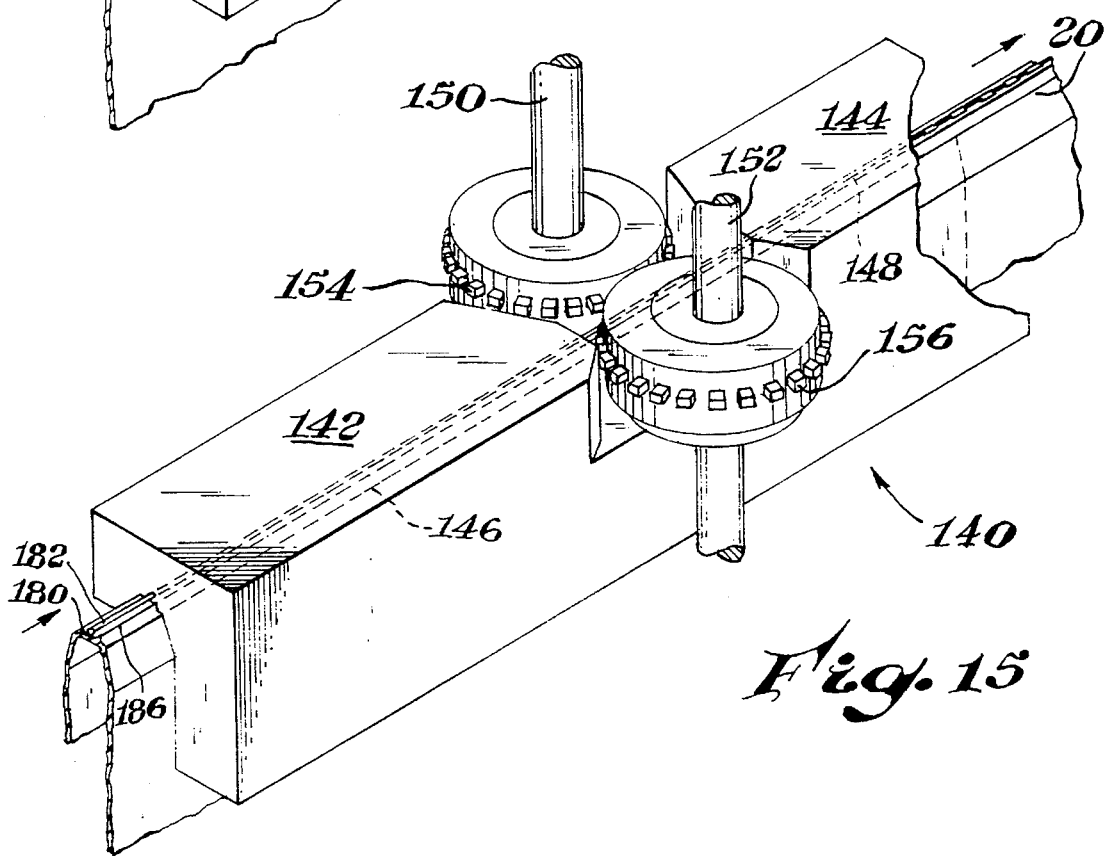

APPARATUS FOR MAKING A ZIPPER FOR A RECLOSABLE THERMOPLASTIC BAG

CROSS-REFERENCE TO RELATED APPLICATION

This application is a continuation of application Ser. No. 07/761,125 filed Sep. 17, 1991, now U.S. Pat. No. 5,307,552 which is divisional of application Ser. No. 07/531,951 filed Jun. 1, 1990, now U.S. Pat. No. 5,070,584 which is a Continuation-In-Part of application Ser. No. 07/491,389 filed Mar. 9, 1990 now abandoned.

BACKGROUND OF THE INVENTION

This invention relates to a reclosable thermoplastic bag having a zipper that creates clicking noise when the zipper is being opened or closed. Further, the zipper imparts a vibration or bumpy feel which is tactile and readily perceptible to the touch when the zipper is closed.

The problem addressed by the present invention pertains to the determination of closure or nonclosure of the zipper of a reclosable bag. Such determination is often difficult save with a close visual examination.

One means of aiding the determination of the state of closure is to utilize a zipper which imparts a visual color change upon closure. Different colors may be utilized in each of the opposing zipper profiles to produce a third distinct color when interlocked. Zippers utilizing such a color change are seen in U.S. Pat. Nos. 4,186,786 and 4,285,105. The disadvantage of using such a color change is that it may occur when the opposing zipper profiles are brought in overlapping proximity instead of only when the profiles are interlocked.

Accordingly, there exists a need for a nonvisual means of determining the state of closure of a zipper for a reclosable bag. Desirably, the zipper would impart a vibratory or bumpy feel perceptible to the touch, and, further desirably, emanate an audible sound along the zipper as it is closed or interlocked.

Prior art zippers on reclosable bags typically impart an audible click only at the point where the opposing zipper profiles are initially interlocked and at the end of the zipper. Further, such zippers do not impart a vibratory or bumpy feel at all. Prior art zippers of such bags do not impart audible clicking sounds along its length between the ends of the zipper as it is being closed or interlocked.

Accordingly, there exists a need for a thermoplastic zipper that imparts a vibration perceptible to the touch, and, further preferably, emanates an audible clicking sound along its length when being closed so that the fact of closure can be confirmed by sound and feel. Accordingly, there exists a need for a reclosable bag having a zipper that imparts a vibration perceptible to the touch, and, further preferably, emanates an audible clicking sound continually along it from end to end.

SUMMARY OF THE INVENTION

According to the present invention, a zipper for a reclosable thermoplastic bag, comprises two opposing, longitudinally extending interlockable rib and groove profiles wherein at least one of the profiles has a longitudinally extending part interlockable with the opposing profile wherein the part is substantially free of interdigitation with the opposing profile and wherein the part has indentions within and intermittently along its length.

Further according to the present invention, a zipper for a reclosable thermoplastic bag comprises two opposing, longitudinally extending interlockable rib and groove profiles wherein at least one of the profiles has a longitudinally extending part interlockable with the opposing profile wherein the part is substantially free of interdigitation with the opposing profile and wherein the part defines a first segment and a second segment along its length. The segments differ in shape.

Further according to the present invention, a zipper for a reclosable thermoplastic bag comprises two opposing, longitudinally extending interlockable rib and groove profiles wherein at least one of the profiles has a longitudinally extending part interlockable with the opposing profile wherein the part is substantially free of interdigitation with the opposing profile and wherein the part is discontinuous in structure along its length.

Further according to the present invention, a zipper for a reclosable thermoplastic bag comprises two opposing, longitudinally extending interlockable rib and groove profiles wherein at least one of the profiles has a longitudinally extending part interlockable with the opposing profile wherein the part is substantially free of interdigitation with the opposing profile and wherein the part is discontinuous in structure along its length. The zipper imparts a vibratory or bumpy feel perceptible to the touch when the profiles are interlocked along its length.

Further according to the present invention, a zipper for a reclosable thermoplastic bag comprises two opposing, longitudinally extending interlockable rib and groove profiles wherein at least one of the profiles has a longitudinally extending part interlockable with the opposing profile and wherein the part is discontinuous in structure along its length. The zipper imparts an audible clicking sound continually along its length when the profiles are interlocked or separated.

Further according to the present invention, there is an apparatus for making a longitudinally extending zipper for a thermoplastic reclosable bag comprising a means for providing a first profile having a longitudinally extending part interlockable with a longitudinally extending opposing second zipper profile, a means for deforming the part to form indentions therein intermittently along its length a means for providing the second zipper profiler and a means for interlocking the first and second profiles such that the indentions within the part are substantially free of interdigitation with portions of the second profile.

Further according to the present invention, there is an apparatus for making a longitudinally extending zipper for a thermoplastic reclosable bag comprising a means for providing a first zipper profile having a longitudinally extending part interlockable with a longitudinally extending opposing second zipper profile, a means for aligning the first profile in a fixed position, a means for removing portions of the part to form indentions therein intermittently along its length, a means for providing the second zipper profile, and a means for interlocking the first and second profiles such that the indentions within the part are substantially free of interdigitation with portions of the second profile.

Further according to the present invention, there is a process for making a longitudinally extending zipper for a thermoplastic reclosable bag comprising providing a first zipper profile having a longitudinally extending part interlockable with a longitudinally extending opposing second zipper profile, deforming or removing portions of the part to form indentions therein intermittently along its length, providing the second zipper profile, and interlocking the first and second profiles such that the indentions within the part are substantially free of interdigitation with portions of the second profile.

BRIEF DESCRIPTION OF THE DRAWINGS

The novel features of the present invention and the context within which they are set will be better understood upon reviewing the following specification together with the several drawings in which the same reference numbers are employed for the same parts in the various views and wherein:

FIG. 14 is an isometric view of a punching apparatus according to the present invention wherein a zipper profile is being processed therethrough and shown fragmentarily.

FIG. 15 is an isometric fragmentary view of a deforming apparatus according to the present invention wherein a zipper profile is being processed therethrough and shown fragmentarily.

DETAILED DESCRIPTION

Figure 1:
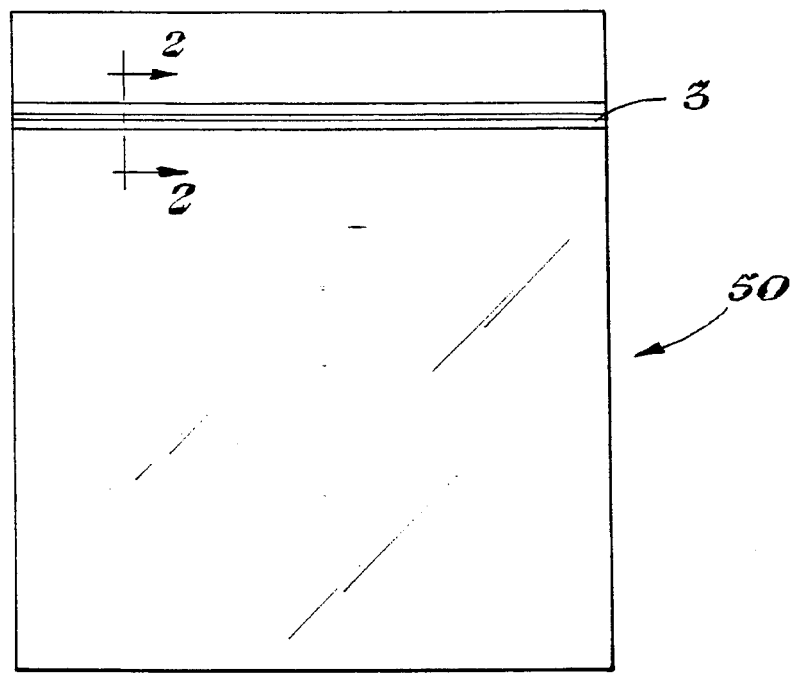
FIG. 1 is a front elevational view of a reclosable thermoplastic bag having a zipper in accordance with the present invention.

A zipper 3 for a reclosable thermoplastic bag 50 is illustrated in FIG. 1. Zipper 3 is preferably continuous in length across the opening at the top of bag 50. Zipper 3 is comprised of a thermoplastic material, and can be comprised of the same or different material as the remainder of bag 50.

Generally, zipper 3 comprises opposing, longitudinally extending interlockable rib and groove profiles (zipper profiles). At least one of the profiles has indentions within and intermittently along its length preferably along a surface of it adjacent a portion of the opposing profile. Preferably, the indentions are present in and along a part of the zipper profile interlockable with a part of the opposing zipper profile wherein both of the interlockable parts are longitudinally extending. Further preferably, the indentions and the surfaces which define or bound the indentions of the part of the zipper profile are adjacent the part of the opposing zipper profile with which it is interlocked. Further preferably, the part of the zipper profile having indentions therein is substantially free of interdigitation with the part of the opposing zipper profile with which it is interlockable. Being substantially free of interdigitation means that the cavities defined by the indentions within the part are substantially free of intrusion by portions of the part of the opposing profile. Being substantially free of interdigitation can be advantageous because the opposing profiles can be more easily interlocked because the opposing structures along the profiles need not be mated and matched to as significant a degree. The presence of indentions within a profile or part thereof results in the profile or part thereof being structurally discontinuous along its length and having at least two different segments along it wherein the segments are different in shape. Preferably, the profile or part thereof has two different or first and second segments which alternate along the entire length of the profile. Thus, the shape of the profile or part thereof alternates between two different shapes segmentally along the profile. Either or both of the rib or the groove profiles or parts thereof may have segments of differing shape, but preferably only the rib profile has such.

Figure 2:
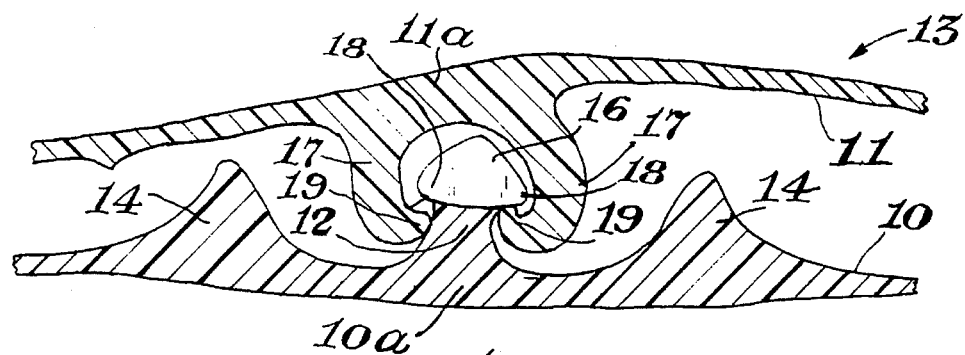
FIG. 2 is an enlarged cross-sectional view taken along reference line 2—2 of FIG. 1 of an embodiment of the zipper wherein the zipper has a groove profile and a rib profile, the rib profile being intermittently segmented at a head of the rib profile.

More specifically, in an embodiment of the zipper in accordance with the present invention as illustrated in FIG. 2, zipper 13 comprises opposing, essentially continuous longitudinally extending interlockable rib profile 10 and groove profile 11. Rib profile 10 is seen in fragmentary isolation in FIG. 6.

Figure 6:
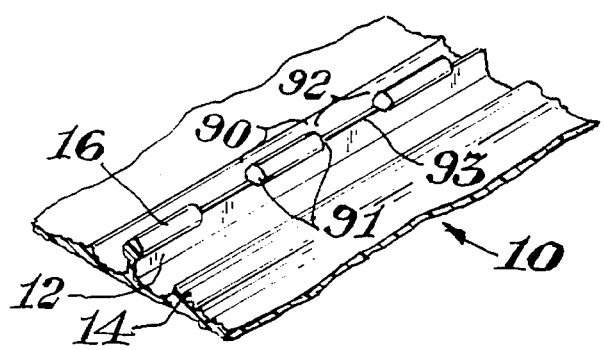
FIG. 6 is an enlarged isometric fragmentary view partly in section of the rib profile of the embodiment of the zipper shown in FIG. 2.

Viewing both FIGS. 2 and 6, rib profile 10 defines a bulbous head 16 generally triangularly shaped in cross-sections a stem 12, and optionally one or more ribs 14 adjacent stem 12. Stem 12 is essentially continuous, and longitudinally extends along profile 10. Head 16 is essentially continual, and longitudinally extends intermittently and preferably alternately along profile 10 resulting in structural discontinuity along profile 10. Rib profile 10 defines alternating first segments 90 and second segments 92 along it. Segments 90 and 92 have different shapes. Segment 90 has head 16 whereas segment 92 has no such head. The indentions within and along rib profile 10 are manifest in segments 92 by the lack of such a head.

Segments 90 and head 16 have surfaces 91 which are generally planar and perpendicular to the longitudinal extension of head 16. Segments 92 define surfaces 93 which are generally planar and positioned transversely to and preferably at about right angles to surfaces 91.

Stem 12 extends from a rib base 10a to define head 16 at its free end intermittently along profile 10. Head 16 includes oppositely disposed outwardly extending hooks 18. Groove profile 11 defines generally U-shaped groove arms 17, which extend from a groove base 11a. Groove arms 17 straddle head 16 when profiles 10 and 11 are interlocked, and define hooks 19 at the free ends of arms 17. Head 16 constitutes a longitudinally extending part of profile 10 interlockable with an essentially continuous and longitudinally extending part of profile 11 constituting groove arms 17. Hooks 19 engage and are interlockingly coextensive with the hooks 18 of head 16. Preferably, the indentions within segments 92 are substantially free of interdigitation by portions of groove arms 17.

Figure 3:
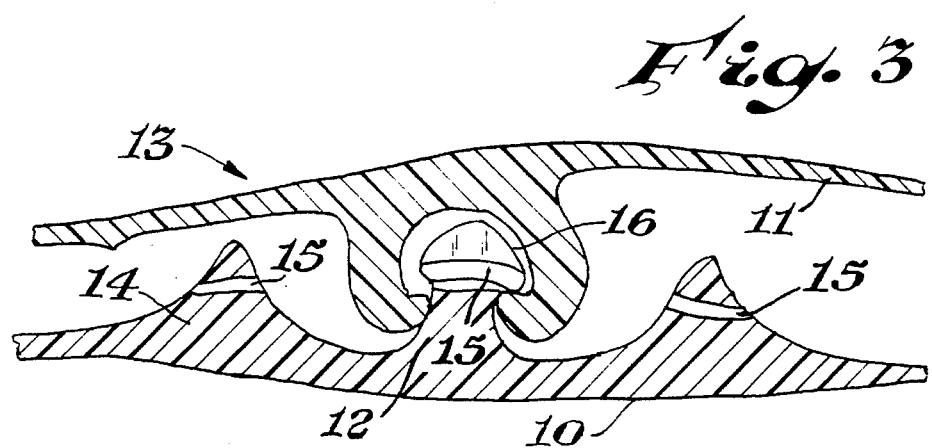
FIG. 3 is an enlarged cross-sectional view of the zipper of FIG. 2 wherein the zipper has regimes of colored thermoplastic material in the rib profile including the head.

A zipper profile may have a regime of colored thermoplastic material extending longitudinally through them sandwiched between noncolored thermoplastic material such as in profile 10 of zipper 13 of FIG. 3. The regime of colored thermoplastic material may further be situated in the profile such that it is carried by a portion or portions of the profile interrupted by indentions within and along it. Since the affected portions carrying the colored thermoplastic material extend continually or intermittently but not continuously along the profile, a colored dashed line or dashed strip is observed. The segments along the profile not having the affected portions are of a different shape than those that do.

FIG. 3 illustrates zipper 13 of the present invention with head 16 and ribs 14 of rib profile 10 having a regime of colored thermoplastic material 15 extending continually and longitudinally through head 16 and continuously and longitudinally through ribs 14. Regime 15 is positioned in profile 10 such that it is carried by a portion or portions (head 16) of profile 10 interrupted by indentions within and along profile 10. A distinct alternation of color akin to a dashed line along head 16 is imparted.

When profiles 10 and 11 are interlocked while viewing through profile 11, a color change may be observed at the portion of groove profile 11 where groove arms 17 contact with the remainder of profile 11 if the virgin, untinted thermoplastic material comprising profile 11 is thick enough at that portion to be translucent instead of transparent but not thick enough to be opaque. If that portion is translucent when rib profile 10 having colored thermoplastic material in head 16 is brought into interlockment with groove profile 11, the color of head 16 is readily visible through the translucent portion of profile 11 and imparts the effect of a color change.

Figure 7:
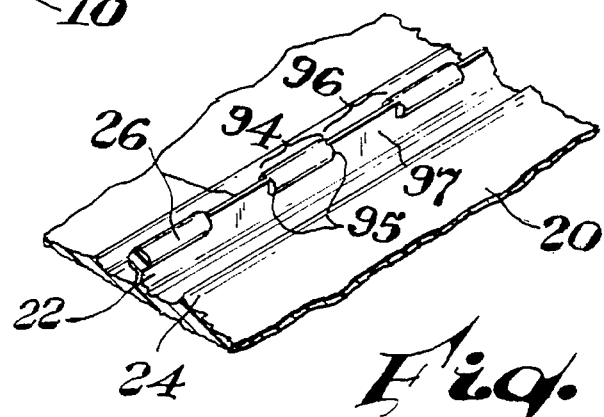
FIG. 7 is an enlarged isometric fragmentary view partly in section of the rib profile of the embodiment of the zipper shown in FIG. 4.
Figure 4:
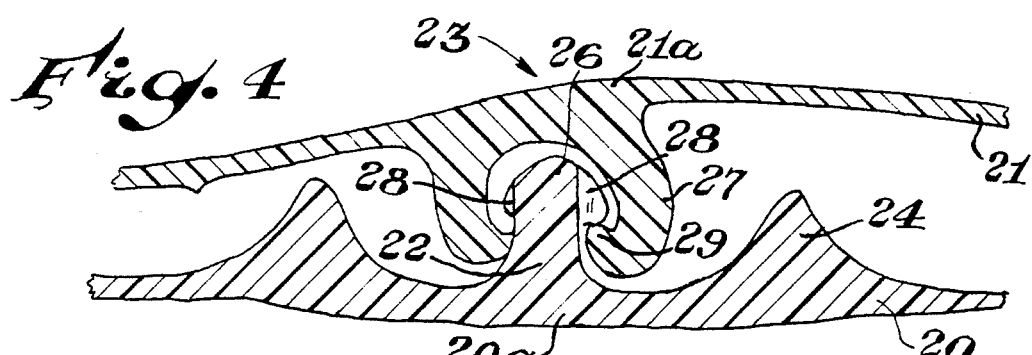
FIG. 4 is an enlarged cross-sectional view similar to that of FIG. 2 only of a second embodiment of a zipper in accordance with the present invention wherein the zipper has a groove profile and a rib profile, the rib profile being intermittently segmented at hooks of a head of the rib profile.

Another embodiment of the zipper of the present invention is seen in zipper 23 of FIG. 4. Zipper 23 comprises opposing longitudinally extending interlockable rib profile 20 and groove profile 21. Viewing both FIGS. 4 and 7, rib profile 20 defines a head 26, a stem 22, and optionally one or more ribs 24. Stem 22 and ribs 24 are essentially continuous, and longitudinally extend along profile 20. Head 26 longitudinally extends along profile 20. Rib profile 20 defines alternating first segments 94 and second segments 96 along its length. Segments 94 and 96 have different shapes by virtue of the differing shapes of head 26 resulting in a structural discontinuity along profile 20. In segment 94, head 26 has outwardly extending hooks 28 whereas in segment 96 head 26 has no such hooks. The indentions within and along head 26 and rib profile 20 are manifest in segments 96 by the lack of such hooks. Segments 94 and head 26 have surfaces 95 which are generally planar and perpendicular to the longitudinal extension of head 26. Segments 96 define surfaces 97 which are generally planar and positioned at about right angles to surfaces 95. Stem 22 extends from rib base 20a to define head 26 at its free end. Head 26 includes oppositely disposed outwardly extending hooks 28. Groove profile 21 defines groove arms 27. Head 26 constitutes a longitudinally extending part of profile 20 interlockable with an essentially continuous and longitudinally extending part of profile 21 constituting groove arms 27. Groove arms 27 straddle head 26 when profiles 20 and 21 are interlocked, and define hooks 29 which engage and are interlockingly coextensive with the hooks 28 of head 26. Preferably, the indentions within segments 96 are substantially free of interdigitation by portions of groove arms 27.

Figure 5:
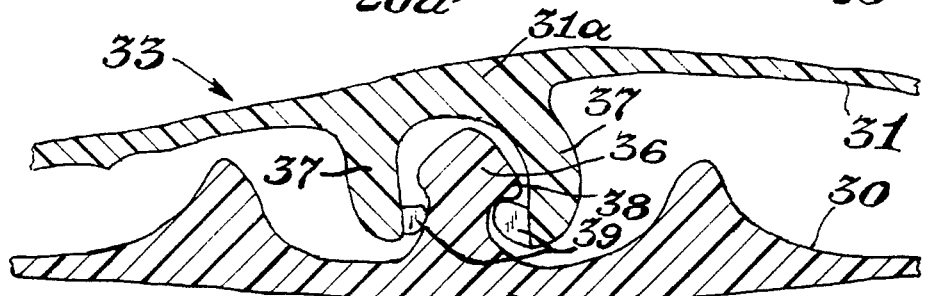
FIG. 5 is an enlarged cross-sectional view similar to that of FIG. 2 only of a third embodiment of the zipper in accordance with the present invention, wherein the zipper has a rib profile and a groove profiler the groove profile being intermittently segmented at hooks of groove arms of the groove profile.
Figure 9:
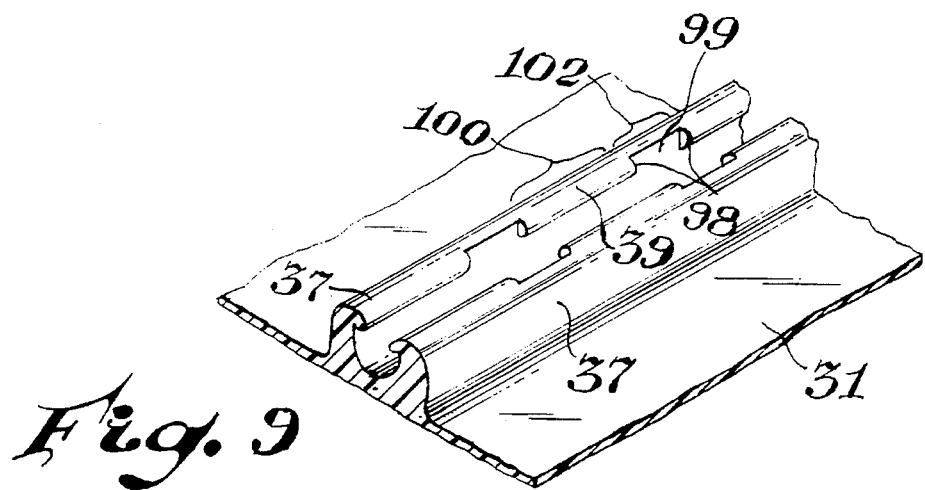
FIG. 9 is an enlarged isometric fragmentary view partly in section of the groove profile of the embodiment of the zipper shown in FIG. 5.

Another embodiment of the zipper of the present invention is shown in zipper 33 of FIG. 5. Zipper 33 comprises opposing longitudinally extending interlockable rib profile 30 and groove profile 31. Viewing both FIGS. 5 and 9, groove profile 31 defines generally U-shaped groove arms 37, which extend from groove base 31a, and are longitudinally extending. Groove profile 31 defines intermittent and preferably alternating first and second segments 100 and 102 along it. Segments 100 and 102 have different shapes by virtue of the differing shapes of groove arms 37 resulting in a structural discontinuity along profile 31. In segment 100, groove arms 37 have hooks 39 at their free ends whereas in segment 102 arms 37 have no such hooks. The indentions within segments 102 are manifest by the lack of such hooks. Groove arms 37 of segments 100 have surfaces 98 which are generally planar and perpendicular to the longitudinal extension of groove arms 37. Segments 102 define surfaces 99 which are generally planart positioned at about right angles to surfaces 98, and are directional with the longitudinal extension of groove arms 37. Rib profile 31 of FIG. 5 defines a head 36. Groove arms 37 constitutes a longitudinally extending part of profile 31 interlockable with an essentially continuous and longitudinally extending part of profile 30 constituting head 36. Groove arms 37 straddle head 36 when profiles 30 and 31 are interlocked. Head 36 has hooks 38 oppositely situated and generally perpendicularly aligned about the longitudinal extension of head 36. Head 36 defines hooks 38 which engage and are interlockingly coextensive with the hooks 39 of groove arms 37. Preferably, the indentions within segments 102 of groove arms 37 are substantially free of interdigitation by portions of head 36.

Figure 8:
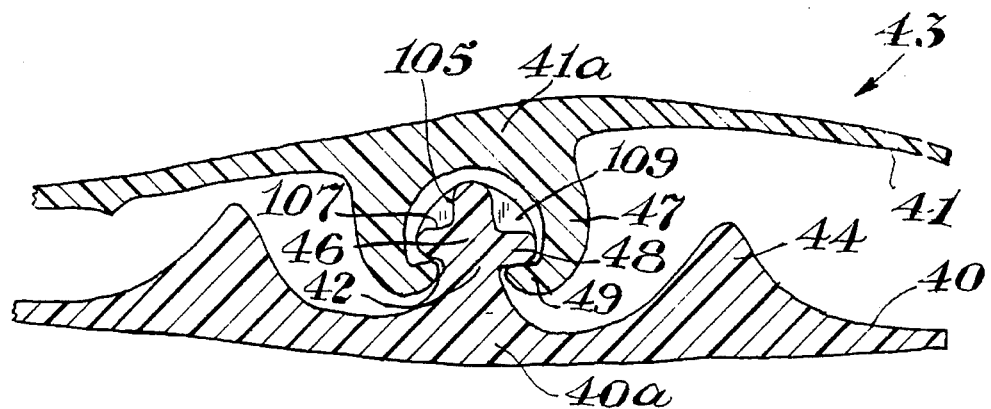
FIG. 8 is an enlarged cross-sectional view of a fourth embodiment of the zipper similar to that of FIG. 2 only, wherein the zipper has a groove profile and a rib profiler the rib profile being intermittently segmented at upper lateral portions of a head of the rib profile.
Figure 10:
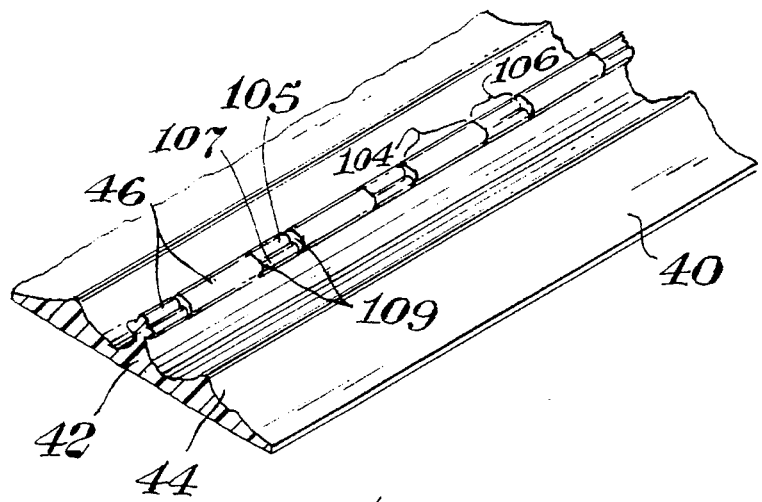
FIGS. 10 is an enlarged isometric fragmentary view partly in section of the rib profile of the embodiment of the zipper shown in FIG. 8.

A preferred embodiment of the zipper of the present invention is shown in zipper 43 of FIG. 8. Zipper 43 comprises opposing longitudinally extending interlockable rib profile 40 and groove profile 41. Viewing both FIGS. 8 and 10, rib profile 40 defines a head 46, a stem 42, and one or more ribs 44. Stem 42 and ribs 44 are essentially continuous, and longitudinally extend along profile 40. Head 46 extends longitudinally along profile 40. Rib profile 40 defines intermittent and preferably alternating first segments 104 and second segments 106. Segments 104 and 106 have different shapes. Head 46 is generally clover-shaped or clover leaf-shaped in segment 104 and preferably generally bulbous in shape in segment 106 resulting in structural discontinuity along profile 40. The term "bulbous" in this specification includes not only round but also generally arrow-like or triangular-shaped as is commonly seen in the prior art. Indentions within segments 104 are manifest by the lack of upper laterally-disposed portions of head 46 in segments 106. The upper laterally-disposed portions of head 46 are those which are present in head 46 in segment 104 but not segment 106. Segments 104 and head 46 have surfaces 109, which are preferably generally planar and perpendicular to the longitudinal extension of head 46. Segments 106 define surfaces 105 and 107 which are preferably generally planar and positioned at about right angles with respect to each other and surfaces 109. Though shown in FIG. 10 as being situated at about right angles to surfaces 105 and 107, surfaces 109 alternately may taper at their bottoms into surfaces 105 and 107. Stem 42 extends from rib base 40*a* to define head 46 at its free end. Head 46 includes oppositely disposed outwardly extending hooks 48. Head 46 constitutes a longitudinally extending part of profile 40 interlockable with an essentially continuous and longitudinally extending part of profile 41 constituting groove arms 47. Groove arms 47 extend from groove base 41*a* of groove profile 41. Groove arms 47 straddle head 46 when profiles 40 and 41 are interlocked, and define hooks 49 at their free ends to be engageable and interlockingly coextensive with the hooks 48 of head 46. Preferably, the indentions within segments 104 are substantially free of interdigitation by portions of groove arms 47.

Figure 12:
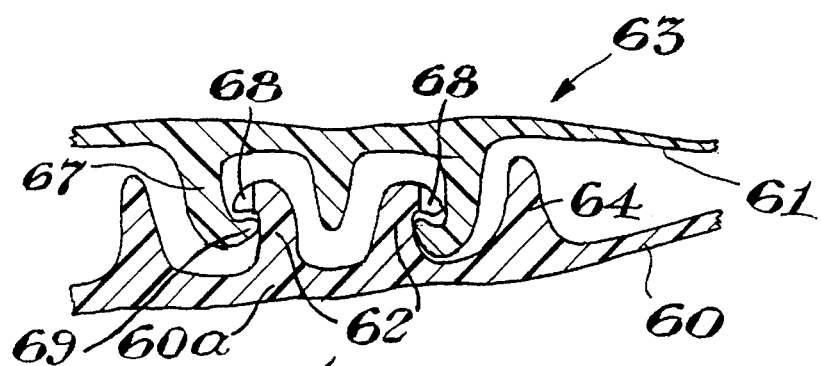
FIG. 12 is an enlarged cross-sectional view similar to that of FIG. 2 only of a fifth embodiment of the zipper of FIG. 1 in accordance with the present invention wherein the zipper has a groove profile and a rib profile, the rib profile being intermittently segmented at hooks of the rib profile.
Figure 13:
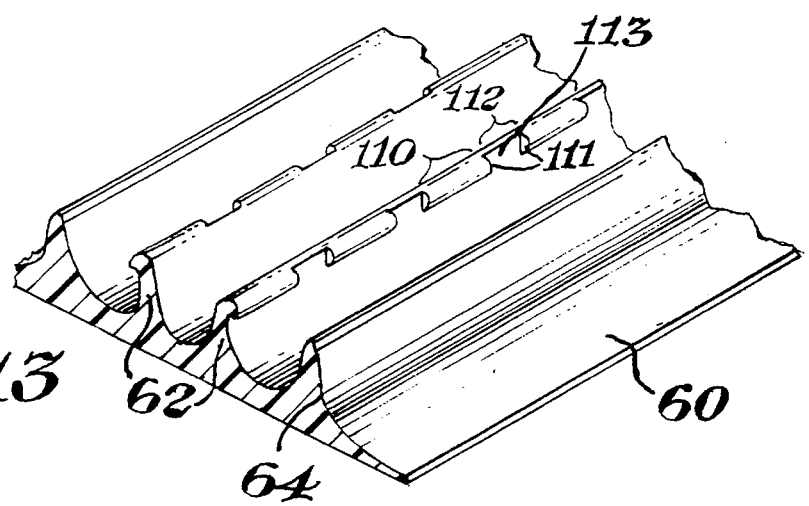
FIG. 13 is an enlarged isometric fragmentary view partly in section of the rib profile of the embodiment of the zipper shown in FIG. 12.

Another embodiment of the zipper of the present invention is seen in zipper 63 of FIG. 12. Zipper 63 comprises opposing longitudinally extending interlockable rib profile 60 and groove profile 61. Viewing both FIGS. 12 and 13, rib profile 60 defines a pair of spaced-apart, generally parallely-disposed rib arms 62 and optionally one or more ribs 64. Ribs 64 are essentially continuous, and longitudinally extend along profile 60. Rib arms 62 longitudinally extend along profile 60. Rib profile 60 defines intermittent and preferably alternating first segments and second segments 110 and 112 along it. Segments 110 and 112 have different shapes by virtue of the different shapes of rib arms 62 resulting in structural discontinuity along profile 60. In segments 110, rib arms 62 define at their ends hooks 68, which face away from each other. In segments 110, rib arms 62 lack hooks 68 at their ends. The indentions within rib arms 62 and along rib profile 60 are manifest in segment 112 by the lack of such hooks. Segments 110 and rib arms 62 have surfaces 111 which are generally planar and perpendicular to the longitudinal extension of rib arms 62. Segments 112 define surfaces 113 which are generally planar and positioned at about right angles to surfaces 111. Rib arms 62 extend from rib base 60*a* of rib profile 60. Hooks 68 are spaced apart and disposed transverse or perpendicular to the longitudinal extension of rib profile 60. Rib arms 62 constitute a longitudinally extending part of profile 60 interlockable with an essentially continuous and longitudinally extending part of profile 61 constituting groove arms 67. Groove profile 61 defines spaced apart and generally parallely-disposed groove arms 67. Groove arms 67 straddle rib arms 62 when profiles 60 and 61 are interlocked, and at their free ends define inwardly-facing hooks 69, which engage and are interlockingly coextensive with the hooks 68 of rib arms 62. Preferably, the indentions within segments 112 are substantially free of interdigitation by portions of groove arms 67.

Figure 11:
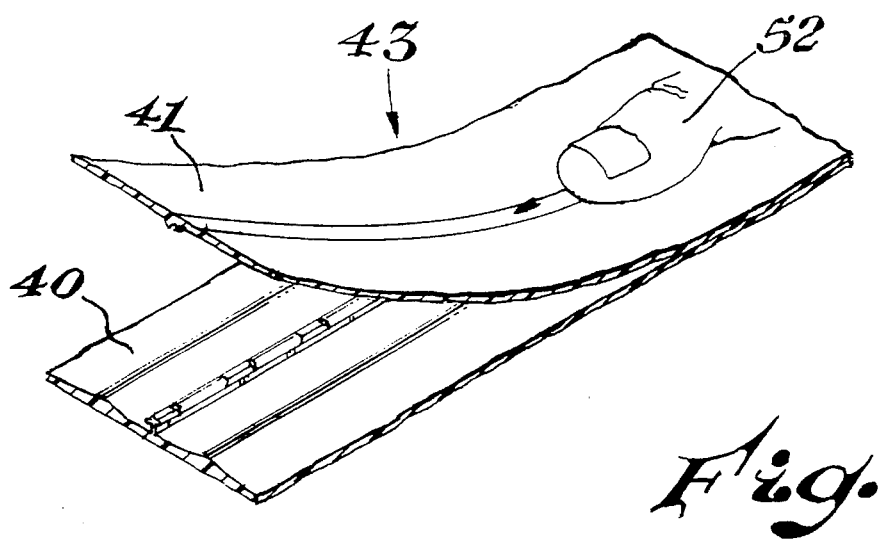
FIG. 11 is an enlarged isometric fragmentary view partly in section of the zipper shown in FIG. 8 wherein the rib and the groove profile are being interlocked by hand.

FIG. 11 shows zipper 43 of a preferred embodiment being interlocked by hand manipulation in the form of thumb 52. While not bound by any particular theory, the audible clicking sound and the vibratory or bumpy feel are believed to result from hooks 49 of groove arms 47 contacting planar surfaces 107 and 109 of head 46 as rib and groove profiles 40 and 41 are interlocked from one end of zipper 43 to the other or from one point along zipper 43 to another point along the same.

The disclosed embodiments of the present invention are not to be construed as limiting. The art is replete with zippers and reclosable fasteners of different structures and configurations adaptable to thermoplastic bags. Examples of this art are seen in U.S. Pat. Nos. 4,363,345, 4,561,109, and 4,528,224. Prior art zipper structures can readily be modified in accordance with the present invention to form a zipper having the desired audible clicking and/or vibratory and bumpy feel which is tactile and perceptible to the touch.

While not bound by any particular theory, it is believed that the means by which the zippers of the present invention create an audible clicking sound and/or impart a vibratory or bumpy feel perceptible to the touch upon interlockment of the zipper profiles is the presence of an intermittent discontinuity in structure along portions of either or both of the rib or groove profiles. The discontinuity in structure is typically in those portions of the opposing profiles which contact each other upon interlockment of the zipper.

The features of audible clicking and vibratory or bumpy feel of zippers of the present invention are separable. A zipper may impart a vibratory or bumpy feel which is tactile or perceptible to the touch without imparting an audible clicking sound and be within the scope of the present invention.

Zippers of the present invention may have as many as three or more intermittent or alternating segments of differing shape along a profile, but preferably has intermittent or alternating segments of two different shapes. The segments of differing shape may be of equal or unequal length. Preferably, the segments having indentions within them are of lesser relative length than those segments not having indentions within them so as to minimize the likelihood or incidence of liquid leakage through the interlocked zipper. The segments having indentions within them have an incidence along a profile preferably of from 1 to 8, more preferably 3 to 6, and most preferably 5 per inch of profile. The length of each segment having an indention within is preferably from about 1/8th to about 1/32nd and most preferably about 1/16th of an inch.

The terms "rib profile" and "groove profile" are used as terms of convenience to describe opposing interlockable male and female zipper profiles, and are not to be construed as limiting.

Zippers of the present invention may have either or both of the zipper profiles comprised in whole or in part of a "colored" thermoplastic material. "Colored" means that the thermoplastic may be tinted transparent, tinted translucent, or tinted opaque relative to the transparent look or lack of tint or color normally associated with virgin thermoplastic materials.

Zippers according to the present invention may have opposing rib and groove profiles wherein each profile is transparent or translucent and of a different color. The opposing profiles may be interlocked to produce a predetermined third color. For instance, profile having a blue color and an opposing profile having a yellow profile could be interlocked to impart a green color.

Zippers of the present invention preferably are substantially leakproof. Surfaces of the interlockable rib and groove profiles preferably form a contiguous or snug fit with each other along the zipper.

Zipper profiles (rib or groove) of zippers of the present invention may be formed by direct extrusion of the profile having indentions within and along its length, but are preferably formed by directly extruding the profile without indentions within and along its length, and subsequently imparting indentions within and along the profile by deforming and/or removing portions of the profile. Alternately, the zipper profiles may be described as being formed by direct extrusion of the profile defining at least two different segments of different shapes along its length, but are preferably formed by directly extruding the profile without segments of different shapes, and subsequently forming the profile to define at least two different segments of different shapes along its length by deforming and/or removing portions of the profile.

An apparatus according to the present invention for making a longitudinally extending zipper for a thermoplastic reclosable bag, comprises a means for providing a first zipper profile having a longitudinally extending part interlockable with a longitudinally extending opposing second zipper profile, a means for aligning the first profile in a fixed position, a means for deforming the part to form indentions therein intermittently along its length, a means for providing the second zipper profile, and a means for interlocking the first and second profiles such that the indentions within the part are substantially free of interdigitation with portions of the second profile. Alternately, the means for deforming the part may be substituted by a means for removing portions of the part to form indentions therein intermittently along its length.

The means for providing the first and second zipper profiles may comprise an extruder (not shown) and a die means (not shown) to shape the profile as is commonly known in the art. The means for providing the first and second zipper profiles may also comprise a means for advancing the profiles.

The means for deforming or removing portions of the part renders the part and the profile structurally discontinuous along their length and forms first and second segments along the length of the part wherein the first and second segments have different shapes. Means for deforming or removing portions of the part forms a profile configuration wherein the first and second segments alternate along the length of the first profile. A preferred part for the first zipper profile takes the form of a bulbous head. A preferred means for providing the first profile comprises providing a first zipper profile having a longitudinally extending bulbous head which is interlockable with an opposing second zipper profile or part thereof. A preferred means for deforming or removing portions of the part comprises deforming or removing portions of the bulbous head. A preferred means for deforming or removing portions of the bulbous head may form intermittent and preferably alternating first and second segments along the length of the bulbous head wherein the first segment is bulbous and the second segment is generally clover-shaped.

The means for interlocking the opposing first and second profiles may take the form of juxtapositioned closing rollers (not shown) as commonly known in the art. The opposing profiles are interlocked as they pass between the closing rollers. The opposing profiles may also be interlocked by hand as seen in FIG. 11. The interlocking means will interlock the opposing profiles such that the indentions within the part are substantially free of interdigitation with portions of the second profile. Preferably, the interlocking means interlocks the first profile with a second zipper profile which is longitudinally extending and essentially continuous in structure in that it does not define projections extending therefrom or indentions therein along its length. However, neither of the opposing profiles, including the second profiler must be essentially continuous in structure along their lengths. Both first and second profiles may have indentions therein along their lengths.

Figure 22:
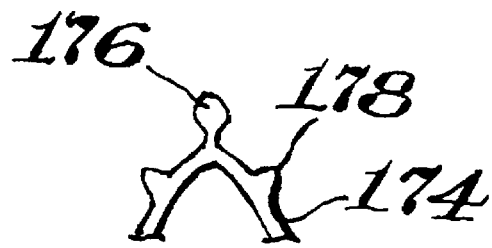
FIG. 22 is an enlarged cross-sectional view taken along a reference line 22—22 of FIG. 14 of the zipper profile as it exits a first channel block and enters a punching means of the punching apparatus.

A means for removing portions of the bulbous head may comprise a means for punching out portions of the bulbous head to form indentions therein intermittently along its length. The punching means may comprise a means for intermittently or continually laterally punching out a portion of the head. A lateral punching means of the present invention is shown as punching apparatus 120 in FIGS. 14 and 16. Punching apparatus 120 intermittently punches out a part such as a head 176 of a first zipper profile such as a rib profile 174 interlockable with an opposing groove profile to form a rib profile similar to that shown as profile 10 in FIGS. 2, 3, 6, 14, and 16. Punching apparatus 120 is hereafter described with reference to rib profiles 174 and 10 for purposes of convenience and illustration. Rib profile 174 is seen in FIGS. 14 and 22 as the rib profile entering punching apparatus 120. Apparatus 120 intermittently punches out head 176 of rib profile 174 to form rib profile 10 wherein profile 10 has first and second segments 90 and 92.

The means for aligning the profile in a fixed position in apparatus 120 comprises first and second channel blocks 122 and 124, respectively. Channel blocks 122 and 124 have channels 126 and 128, respectively, extending therethrough from one end to the other, and are adapted to receiving and conveying the rib profile. Channels 126 and 128 may be designed to accommodate rib profiles 174 and 10 only or the same rib profiles and adjoining bag film web portions with which it may have been integrally formed or to which it may have been laminated. Channels 126 and 128 are preferably in vertical and horizontal alignment with each other. Channel 126 is configured to convey rib profile 174 to the sides of head 176 to be contacted by punches 134 laterally and perpendicularly to the longitudinal extension of head 176 without obstruction of same by ribs 178 as seen in FIG. 22. Preferably, the head 176 is lifted such that it is vertically higher than the remainder of the zipper profiler as shown in FIG. 22, before portions of the bulbous head are intermittently laterally punched out. Channel 126 may be configured to lift head 176, or, more preferably, to merely force ribs 178 outward out of position to obstruct lateral access to head 176. Channel 126 is preferably configured to receive rib profile 174 in its normal posture wherein head 176 is generally horizontally level with ribs 178 as seen in FIG. 14 and with other rib profiles such as in FIGS. 2, 4, and 5. Channel 126 preferably gradually changes in configuration from one end to the other from a shape coextensive with the level posture of the rib profile to one which is coextensive with the desired posture wherein unobstructed lateral access is afforded to the head of the rib profile. Channel 128 is preferably configured to receive rib profile 10 in the arched posture at its entrance, and gradually changes in configuration to a shape at its exit coextensive with the level posture of profile 10 seen in FIG. 6 or downstream of apparatus 120 in FIG. 14.

Figure 16:
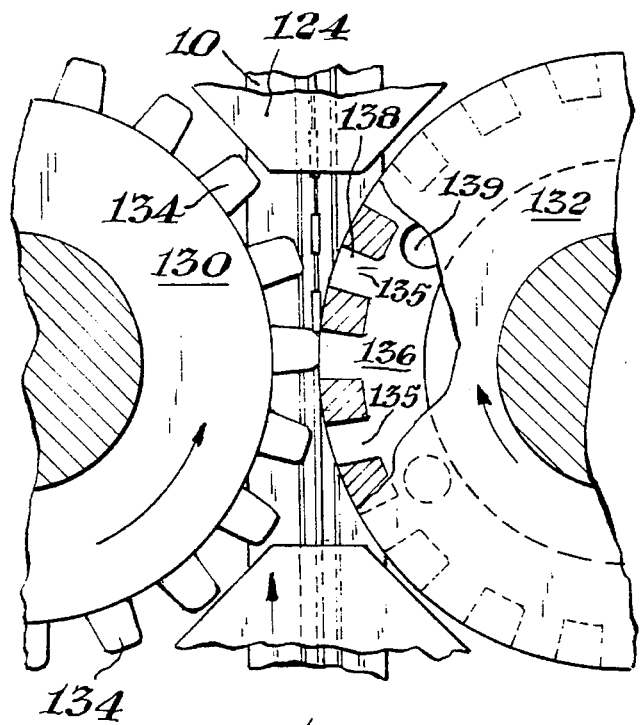
FIG. 16 is an enlarged fragmentary top view of the apparatus of FIG. 14.

The means for intermittently laterally punching out the head of the rib profile comprises first and second rotary members 130 and 132, respectively. Rotary members 130 and 132 are situated between channel blocks 122 and 124, respectively. First rotary member 130 has a plurality of radially situated, outwardly-projecting punches 134. Second rotary member 132 defines a plurality of radially situated bores 135 and a cavity 136 therein. Bores 135 extend from cavity 136 to openings 138 located on the periphery of member 132. At least the front portions of punches 134 are retentionally and intermatingly coextensive with openings 138. Rotary members 130 and 132 are preferably situated with respect to each other so that only the front-most portions of punches 134 extend through openings 138 into bores 135. Preferably, punches 134 extend into openings 138 and bores 135 only about one one-thousandth of an inch at the point of greatest penetration. The front corners of punches 134 are preferably inwardly tapered as seen in FIG. 16, and most preferably have a taper of about 7°. The width of punches 134 is preferably about twice the heighth of same. Punches 134 and bores 135 are spaced about rotary members 130 and 132 respectively in a pitch corresponding to the desired frequency of indentions within or removed portions from the passing rib profile. Rib profile 174 is passed through channel 126 of channel block 122 and between the revolving and intermating punches 134 and bores 135 of rotary members 130 and 132 to form rib profile 10, which is then passed through channel 128 of channel block 132. Head 176 of rib profile 174 is passed between rotary members 130 and 132 at the region of intermating intrusion of punches 80 within bores 135. Bores 135 are adapted to receive excised portions of head 176 punched therefrom, and permit accumulation of same therein until forced by buildup into cavity 136. Cavity 136 is adapted to receiving excised portions, and extends radially within and around rotary member 132. Cavity 136 contains cavity openings 139, which allow excised portions of head 176 to exit or fall out of cavity 136 as excised portions accumulate there.

Means for advancing rib profiles 174 and 10 preferably comprise rotary members 130 and 132, which act to pull rib profile 174 therebetween by compression between punches 134 and bores 135 as members 130 and 132 are rotated. Rotary members 130 and 132 may be rotated by mechanical or electromechanical means known in the art (not shown). Other conceivable means for advancing rib profile 174 and 10 include mechanized feed and takeup rolls (not shown).

Figure 17:
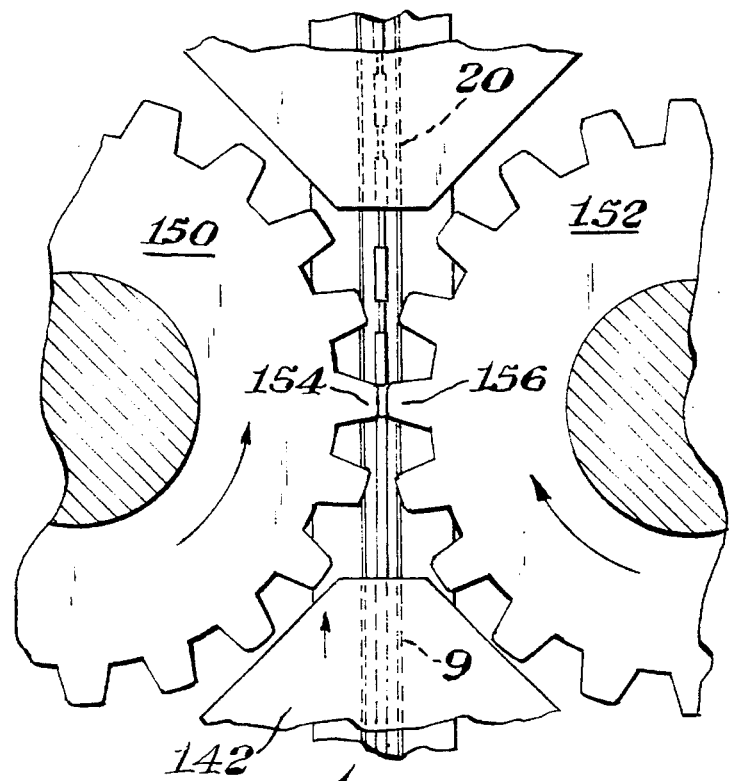
FIG. 17 is an enlarged fragmentary top view of the apparatus of FIG. 15.

A means of deforming a rib profile is shown in FIGS. 15 and 17, and is referred to hereafter as deforming apparatus 140. Deforming apparatus 140 intermittently deforms a part of a rib profile 180 interlockable with an opposing groove profile such as head 182 to form a profile similar to that shown as profile 20 in FIGS. 2, 3, and 4, 7, and 15. Rib profile 180 may have ribs 186 extending therefrom on either side of head 182. Deforming apparatus 140 is hereafter described with reference to profiles 9 and 20 for purposes of convenience and illustration. Deforming apparatus 140 has a means for deforming the head of the rib profile comprising a means for positioning and aligning the profile and a means for deforming the head of the rib profile.

The means for positioning and aligning rib profile 20 comprises first and second channel blocks 142 and 144, respectively. Channel blocks 142 and 144 have channels 146 and 148, respectively, therethrough retentionally and slideably coextensive with rib profile 20. The structure and function of channel blocks 142 and 144 is substantially the same as that of channel blocks 122 and 124 of punching apparatus 120.

The means for deforming the head of the rib profile comprises a means for intermittently laterally deforming the head of the rib profile. The lateral deforming means comprises first and second rotary members 150 and 152, respectively. First and second rotary members 150 and 152 each have a plurality of radially situated, outwardly-projecting teeth 154 and 156, respectfully. Rotary members 150 and 152 are positioned with respect to each other so that teeth 154 and 156 of each are spaced apart, but are in alignment and in face-to-face synchronization as members 150 and 152 are each rotated in opposite directions. Members 150 and 154 are further positioned such that the front portions of teeth 154 and 156 contact and straddle the lateral portions or sides of head 182 of passing rib profile 180, but do not excise it. Teeth 154 and 156 are spaced about rotary members 150 and 152 in a pitch corresponding to the desired frequency of indentions within head 182. Rotary members 150 and 152 are situated between channel blocks 142 and 144, respectively.

Means for advancing rib profiles 9 and 20 preferably comprise rotary members 150 and 152, which may be mechanized to pull rib profiles 9 therethrough by compression between teeth 154 and 156 as members 150 and 152 are rotated. Other conceivable means include mechanized feed and takeup rolls (not shown).

Figure 18:
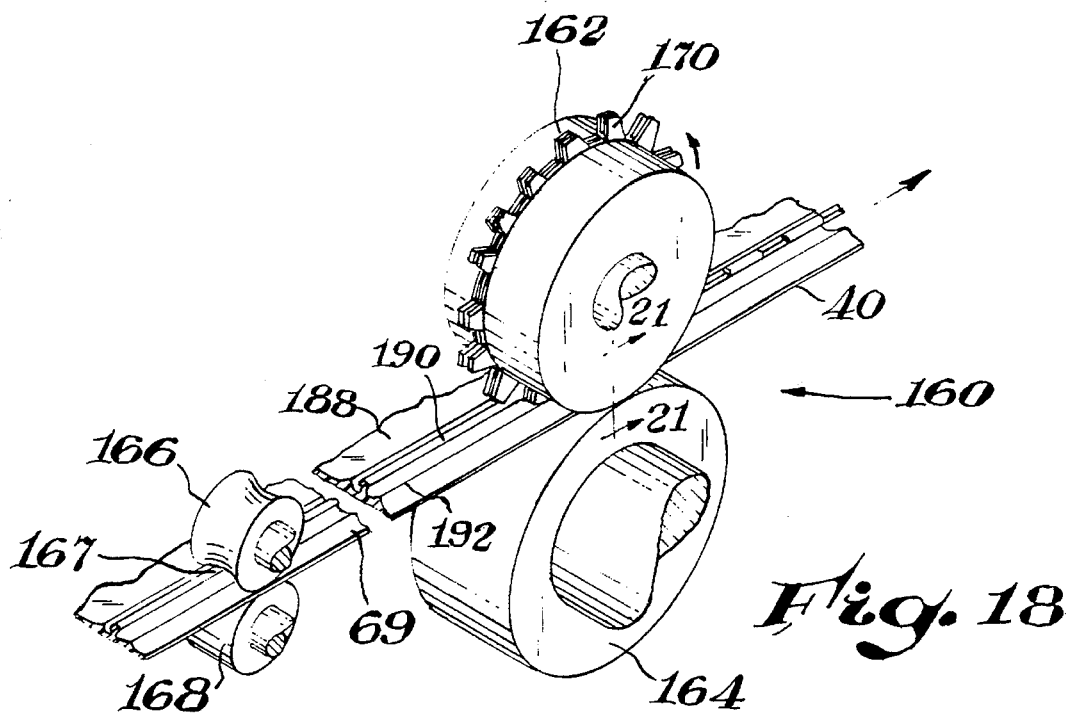
FIG. 18 is an enlarged fragmentary isometric view of another embodiment of a deforming apparatus according to the present invention wherein a zipper profile is being processed therethrough.

A preferred means for deforming a rib profile is shown in FIG. 18, and is referred to hereafter as deforming apparatus 160. Deforming apparatus 160 intermittently deforms a head 190 of a rib profile 188 to form a profile similar to that shown as profile 40 in FIGS. 8, 9, and 18. Profile 188 may further have ribs 192 extending therefrom on either side of head 190. Deforming apparatus 160 is hereafter described with reference to profiles 6 and 40 for purposes of convenience and illustration. Deforming apparatus 160 has a means for deforming the zipper profile which comprises a means for positioning and aligning the profile and a means for deforming the head of the rib profile.

The means for positioning and aligning the rib profile may comprise rollers 166 and 168 upstream of the means for deforming the rib profile as seen in FIG. 18. Rollers 166 and 168 are positioned above and below rib profile 188. Roller 166 preferably has a concave surface, and roller 168 has a concave or planar surface but preferably a planar surface. Rollers 166 and 168 define a cavity 167 therebetween retentionally and slideably coextensive with rib profile 188. The positioning and aligning means is optional in deforming apparatus 160.

Figure 21:
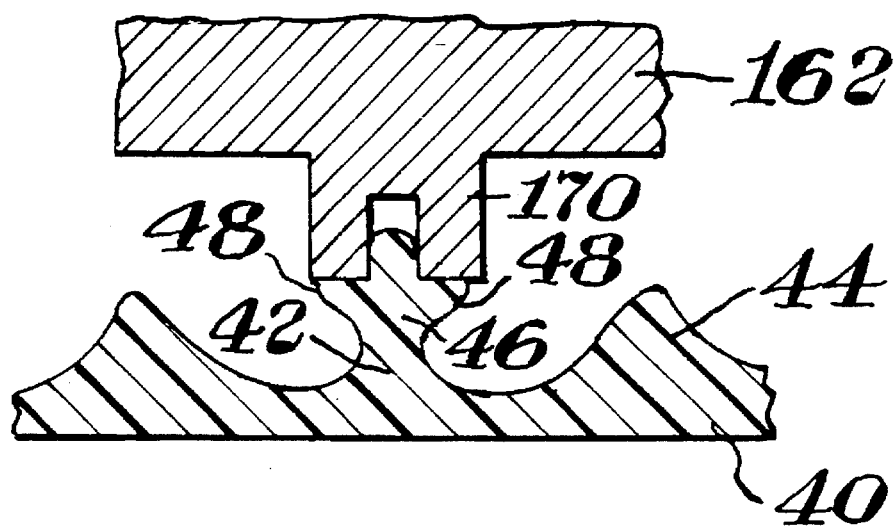
FIG. 21 is a greatly enlarged cross-sectional view taken along a reference line 21—21 of FIG. 17 of a tooth of the deforming apparatus contacting the zipper profile.

The means for deforming the head of the rib profile comprise first and second rotary members 162 and 164. First rotary member 162 has a plurality of radially situated, outwardly-projecting, spaced-apart, generally U-shaped teeth 170. Second rotary member 164 preferably has a circular planar surface, but could be substituted for by a mere flat planar surface (not shown). First member 162 is positioned above and second member 164 below the procession of zipper profile 188 and head 190 preferably in general vertical alignment as seen in FIG. 18. First member 162 is adapted and positioned so that the front portions of each tooth 170 partially intersect head 190 when that tooth 170 is generally normal or perpendicular to head 190 as seen in FIG. 21. Teeth 170 are spaced about rotary member 162 in a pitch corresponding to the desired frequency of indentions within head 190 of passing rib profile 188.

Figure 20:
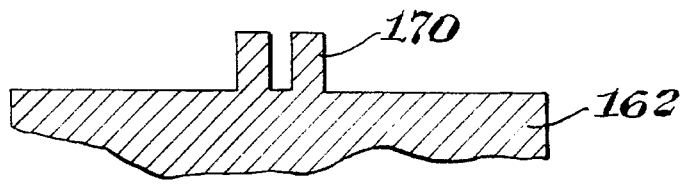
FIG. 20 is a greatly enlarged fragmentary cross-sectional view of the tooth of FIG. 17.
Figure 19:
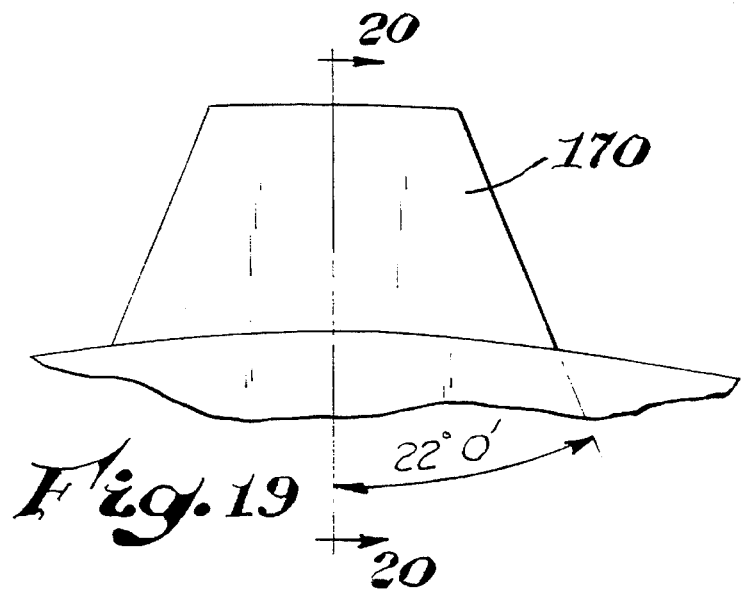
FIG. 19 is a greatly enlarged side view of a tooth of a rotary member of the deforming apparatus of FIG. 17.

Teeth 170 are preferably generally U-shaped or slit-shaped as shown in FIG. 20. First member 162 is adapted and positioned so that each tooth 170 intersects the upper lateral portions of head 190 when that tooth 170 is generally normal or perpendicular to head 190 as seen in profile 40 of FIG. 21. The sides of the same are preferably tapered as shown in FIG. 19 with the most preferred angle of taper as indicated.

Means for advancing rib profiles 6 and 40 preferably comprise mechanized feed and takeup rolls (not shown). Other conceivable means include rotary members 162 and 164, which may be mechanized to pull rib profiles 6 and 40 therethrough by compression between them as they are rotated.

A process according to the present invention for making a longitudinally extending zipper for a thermoplastic reclosable bag comprises providing a first zipper profile having a longitudinally extending part interlockable with an opposing second profile, deforming or removing portions of the part to form indentions therein-intermittently along its length, providing a longitudinally extending second zipper profile, and interlocking the first and second profiles such that the indentions within the part are substantially free of interdigitation with portions of the second profile. Either or both of the zipper profiles may be provided by extrusion of thermoplastic material and shaping into the desired profile configuration utilizing a die as is common in the art. Preferably, the first profile is interlocked with a second zipper profile which is longitudinally extending and essentially continuous in structure. Deforming or removing portions of the part renders the part structurally discontinuous along its length and forms the first and second segments along the length of the part wherein the first and second segments are different in shape. Preferably, deforming or removing portions of the part forms a profile configuration wherein the first and second segments alternate along the length of the profile. A preferred part for the first zipper profile takes the form of a bulbous head. Providing the first zipper profile preferably comprises providing a first zipper profile having a longitudinally extending bulbous head which is interlockable with the opposing zipper profile. Deforming or removing portions of the head may form intermittent and preferably alternating first and second segments along the length of the bulbous head wherein the first segment is bulbous and the second segment is generally clover-shaped.

In removing portions of a head of a rib profile in a process according to the present invention, a first zipper profile in the form of rib profile 174 passes and proceeds between rotary members 130 and 132 to form a rib profile similar to that of rib profile 10. Rib profile 174 is configured to allow head 176 to be laterally contacted by punches 134 without obstruction of same by ribs 178. Punches 134 of member 130 intermittently laterally punch out and remove the generally bulbous head 176 along profile 174. The punching is lateral because it occurs in a direction generally perpendicular to the extension of head 176. The revolving punches 134 push the excised portions of head 176 through openings 138 and bores 135 into cavity 136 and ultimately out of cavity openings 139. Rib profile 10 may then subsequently be interlocked with an opposing second zipper profile such as groove profile 11 to form zipper 13.

In deforming a head of a rib profile in a process according to the present invention, a first zipper profile in the form of rib profile 188 passes and proceeds between rotary members 162 and 164 to form rib profile 40. Teeth 170 in a revolving downward motion contact and deform the generally bulbous head 190 of profile 188 intermittently along its length to form indentions therein manifested in generally clover-shaped segments similar to segments 104 of profile 40 in FIGS. 8 and 10. The front portions of teeth 170 preferably contact and deform head 190 in the upper lateral portions of head 190 to form the desired clover-shaped segments 106 found in zipper profile 40. Rib profile 40 may then subsequently be interlocked with an opposing second zipper profile such as groove profile 41 to form zipper 43.

In deforming a head of a rib profile in a process according to the present invention, a first zipper profile in the form of rib profile 180 passes and proceeds between rotary members 150 and 152 to form a rib profile similar to that of rib profile 20. The configuration of rib profile 180 is modified in block 142 to allow head 182 to be laterally contacted by teeth 154 and 156 without obstruction of same by ribs 186. Teeth 154 and 156 of members 150 and 152 intermittently laterally deform the generally bulbous head 182 of profile 180 along its sides or side portions to form segments 96 of rib profile 20. The deforming is lateral because it occurs in a direction generally perpendicular to the extension of head 180. Rib profile 20 may then subsequently be interlocked with an opposing second zipper profile such as groove profile 21 to form zipper 23.

The teachings of U.S. Ser. No. 491,389 filed Mar. 9, 1990 now abandoned are incorporated herein by reference.

Several of the embodiments of the invention have been shown with regard to specific details in designs for zipper profiles and apparatuses for making same. It will be appreciated that depending upon the zipper profile and apparatus designs and the manufacturers' desires, the invention may be modified by various changes while still being fairly within the scope of the general teachings and principles hereof.

What is claimed is:

1. An apparatus for providing a longitudinally extending zipper with indentations for a thermoplastic reclosable bag, comprising:

(a) a means for receiving a longitudinally extending first zipper profile having a longitudinally extending part interlockable with a longitudinally extending opposing second zipper profile;

(b) a means for aligning the first profile in a fixed position;

(c) a means for removing portions of a longitudinally extending bulbous head interlockable with the second profile, wherein the means for removing portions of the bulbous head comprises a means for intermittently laterally punching out portions of the head such that upon interlocking the profiles the indentations within the part are substantially free of interdigitation.

2. The apparatus of claim 1, wherein the means for removing portions of the part comprises a means for removing portions of a bulbous head interlockable with the opposing profile, the means for aligning the first profile in a fixed position comprising first and second channel blocks, the punching means being situated between the first and second channel blocks, each channel block having a channel therethrough from one end to the other, the channels therethrough being retentionally and slideably coextensive with the first profile, each channel being adapted to receiving and conveying the first profile.

3. The apparatus of claim 2, wherein the first channel is adapted to convey the first profile in a configuration wherein unobstructed lateral access to the head is afforded the removing means.

4. The apparatus of claim 1 wherein the lateral punching means comprises first and second rotary members, the first rotary member having a plurality of punches radially situated and projecting from its periphery, the punches having front portions, the second rotary member defining a plurality of bores therein extending radially from a cavity therein to openings therein at its periphery, the indentions being intermatingly coextensive with at least the front portions of the punches, the bores and the cavity being adapted to receive portions of the head punched therefrom, the cavity defining openings therein adapted to allow the excised or punched portions to fall out.

* * * * *

UNITED STATES PATENT AND TRADEMARK OFFICE
CERTIFICATE OF CORRECTION

PATENT NO. : 5,478,228
DATED : December 26, 1995
INVENTOR(S) : Brian C. Dais et al.

It is certified that error appears in the above-identified patent and that said Letters Patent is hereby corrected as shown below:

On the title page, [75] inventor(s):

[75] Inventors: Brian C. Dais; Jose Porchia, both of Midland; John O. McCree, saginaw; Raymond R. Rydman, Coleman; Bertha R. Vaughn, Midland, all of Michigan should correctly appear as --

[75[ Inventors: Brian C. Dais; Jose Porchia, both of Midland; Raymond R. Rydman, Coleman, all of Michigan Signed and Sealed this Fourteenth Day of May, 1996

Attest:

BRUCE LEHMAN

*Attesting Officer*   *Commissioner of Patents and Trademarks*